US010063939B1

(12) United States Patent
Hegde et al.

(10) Patent No.: US 10,063,939 B1
(45) Date of Patent: Aug. 28, 2018

(54) INTELLIGENT REPLAY OF USER SPECIFIC INTERESTING CONTENT DURING ONLINE VIDEO BUFFERING

(71) Applicant: International Business Machines Corporation, Armonk, NY (US)

(72) Inventors: Santosh Hegde, Bangalore (IN); Uttam Setty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/497,618

(22) Filed: Apr. 26, 2017

(51) Int. Cl.
| H04N 21/81 | (2011.01) |
| H04N 21/45 | (2011.01) |
| H04N 21/234 | (2011.01) |
| H04N 21/258 | (2011.01) |
| H04N 21/435 | (2011.01) |
| H04N 21/44 | (2011.01) |
| H04N 21/2668 | (2011.01) |

(52) U.S. Cl.
CPC ... H04N 21/8126 (2013.01); H04N 21/23406 (2013.01); H04N 21/23424 (2013.01); H04N 21/25891 (2013.01); H04N 21/2668 (2013.01); H04N 21/435 (2013.01); H04N 21/44004 (2013.01); H04N 21/4532 (2013.01)

(58) Field of Classification Search
None
See application file for complete search history.

(56) References Cited

U.S. PATENT DOCUMENTS

| 7,653,131 | B2 | 1/2010 | Pan et al. | |
| 8,069,262 | B2 | 11/2011 | Liu | |
| 8,832,729 | B2* | 9/2014 | Nussel | H04N 21/26233 725/32 |
| 9,032,434 | B2 | 5/2015 | Lee et al. | |
| 9,160,984 | B2 | 10/2015 | Pacor et al. | |
| 9,307,269 | B2 | 4/2016 | Martin et al. | |
| 2002/0091848 | A1* | 7/2002 | Agresta | H04N 7/17318 709/231 |
| 2008/0109556 | A1* | 5/2008 | Karlberg | H04N 7/163 709/231 |
| 2008/0201736 | A1 | 8/2008 | Gordon et al. | |
| 2009/0106442 | A1* | 4/2009 | Liu | H04L 29/06027 709/231 |
| 2009/0319375 | A1* | 12/2009 | Dharmaji | G06F 15/025 705/14.64 |
| 2010/0122305 | A1 | 5/2010 | Moloney | |
| 2010/0153990 | A1* | 6/2010 | Ress | G06Q 30/02 725/34 |

(Continued)

FOREIGN PATENT DOCUMENTS

| JP | 2005346626 A | 12/2005 |
| WO | 2012178174 A1 | 12/2012 |

OTHER PUBLICATIONS

Ha. A. "IBM survey says ads are the biggest reason people consider canceling their streaming video services", retrieved from the https://technical.com/2016/07/06/ibm-svod-survey/; Jul. 2016.

Primary Examiner — Alexander Q Huerta
(74) Attorney, Agent, or Firm — Brown & Michaels, PC; David Woycechowsky (57) ABSTRACT

User-specific interesting content is determined from already buffered video content, which can be replayed to the user while the user waits for additional video content to buffer.

12 Claims, 6 Drawing Sheets

(56) References Cited

U.S. PATENT DOCUMENTS

| | | | |
|---|---|---|---|
| 2011/0296478 A1* | 12/2011 | Jin | H04N 21/4316 725/109 |
| 2012/0072956 A1* | 3/2012 | Thomas | H04N 5/76 725/88 |
| 2012/0331106 A1 | 12/2012 | Ramamurthy et al. | |
| 2013/0054825 A1* | 2/2013 | Mareachen | H04N 21/4325 709/231 |
| 2013/0276041 A1* | 10/2013 | Dutta | H04N 21/4331 725/94 |
| 2014/0285506 A1* | 9/2014 | Paquette | G06T 11/40 345/545 |

\* cited by examiner

INTELLIGENT REPLAY OF USER SPECIFIC INTERESTING CONTENT DURING ONLINE VIDEO BUFFERING

BACKGROUND

The present invention relates to video buffering, and more specifically to intelligent replay of user specific interesting video content during online video buffering.

While a user is waiting for a video to buffer on an internet connection, either the video gets blacked-out, displaying a waiting symbol, or an advertisement is played. While blacking out of the display is not very appealing to the user, on ad-free networks, advertisements are also undesirable. In situations where an advertisement is played, additional bandwidth is required to retrieve the advertisement which consumes the bandwidth otherwise available to buffer the original requested video content.

SUMMARY

According to one embodiment of the present invention, a method of providing non-ad content to a user during buffering of requested video content for display to a user through a display of a computer is disclosed. The computer comprising a browser with a video player and an interesting content engine in communication with a repository. The method comprising the steps of: the computer requesting video content from a content server; the computer receiving buffered video content, associated metadata of the buffered video content, and user specific information; the computer displaying the buffered video content when the quantity of the buffered video content is above a threshold and sending metadata regarding the buffered video content to the content server; the computer receiving metadata of interesting content specific to the user associated with the buffered video content; when the buffered video content is below a threshold, the interesting content engine of the computer determining already buffered video content reflecting user specific interests based on the metadata of interesting content specific to the user and associated with the already buffered video content; and the computer replaying the already buffered content of interest to the user during buffering of the video content requested by the user.

According to another embodiment of the present invention, a computer program product for providing non-ad content to a user during buffering of requested video content for display to a user through a display of a computer is disclosed. The computer comprising at least one processor, one or more memories, one or more computer readable storage media, a browser with a video player and an interesting content engine in communication with a repository. The computer program product comprising a computer readable storage medium having program instructions embodied therewith, the program instructions executable by the computer to perform a method comprising: requesting, by the computer, video content from a content server; receiving, by the computer, buffered video content, associated metadata of the buffered video content, and user specific information; displaying, by the computer, the buffered video content when the quantity of the buffered video content is above a threshold and sending metadata regarding the buffered video content to the content server; receiving, by the computer, metadata of interesting content specific to the user associated with the buffered video content; when the buffered video content is below a threshold, the interesting content engine of the computer determining already buffered video content reflecting user specific interests based on the metadata of interesting content specific to the user and associated with the already buffered video content; and replaying, by the computer, the already buffered content of interest to the user during buffering of the video content requested by the user.

According to another embodiment of the present invention, a computer system for providing non-ad content to a user during buffering of requested video content for display to a user through a display of a computer is disclosed. The computer system comprising a computer comprising at least one processor, one or more memories, a browser with a video player and an interesting content engine in communication with a repository, one or more computer readable storage media having program instructions executable by the computer to perform the program instructions comprising: requesting, by the computer, video content from a content server; receiving, by the computer, buffered video content, associated metadata of the buffered video content, and user specific information; displaying, by the computer, the buffered video content when the quantity of the buffered video content is above a threshold and sending metadata regarding the buffered video content to the content server; receiving, by the computer, metadata of interesting content specific to the user associated with the buffered video content; when the buffered video content is below a threshold, the interesting content engine of the computer determining already buffered video content reflecting user specific interests based on the metadata of interesting content specific to the user and associated with the already buffered video content; and replaying, by the computer, the already buffered content of interest to the user during buffering of the video content requested by the user.

DETAILED DESCRIPTION

In an embodiment of the present invention, a system determines what parts of already buffered video content might be of interest to the user and then replays those parts of interesting video content while the original video content continues to buffer in the background.

For a video provider which has ad-free content, during buffering, a system of the present invention identifies and provides the user with non-ad video content known to be of interest to the user during buffering of the original video content. The non-ad video content can be intelligently determined from the already buffered video content and a player replays those sections of video more often, thereby keeping the user engaged while the original video content is being buffered in the background. Figuring out which sections of video content are of greater interest to the user is done automatically without any explicit inputs from the user, thereby providing a seamless viewing experience for the user of the original video content.

Figure 1:
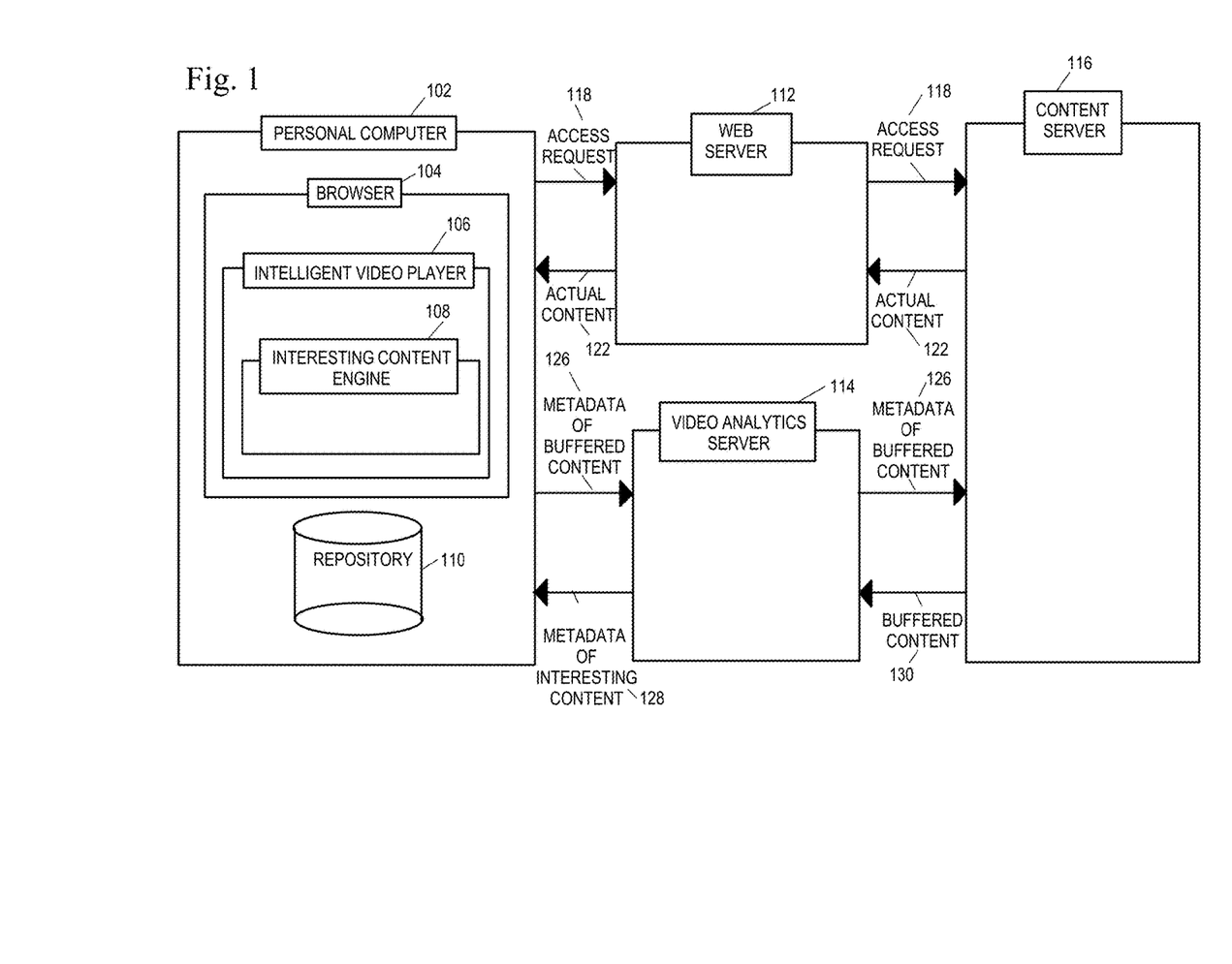
FIG. 1 shows a block diagram of an example of a video analytics system.

FIG. 1 shows a block diagram of an example of a video analytics system.

A personal computer 102 is in communication with a content server 116 through a web server 112. A video analytics server 114 may also be present between the personal computer 102 and the content server 116. The personal computer 102 may be, but is not limited to a mobile device, a tablet or any other computational device.

The personal computer 102 preferably has a browser 104 which can receive a request from the user regarding video content. The browser 104 has an intelligent video player 106. The intelligent video player (IVP) 106 is a video player which can store a buffered video to temporary storage of the personal computer 102, such as database 110 or other memory and display video content to a user through a display of the personal computer 102. The intelligent video player 106 can send a request directly to the video analytics server 114 to obtain information regarding metadata of interesting video content (MIC) 128 for the user. Additionally, the intelligent video player 106 can also use an interesting content engine 108 along with user specific interesting content (USIC) from the buffered video content to determine the video content to replay for the user, for example through a no-ad content program 66. The intelligent video player 106 also has the capability to directly access the Internet without the need for the browser 104. The interesting content engine 108 can combine user specific information (USI) 132 with metadata of interesting video content (MIC) 128 to generate content that can be replayed to the user while buffering of the request video content takes place.

The IVP 106 has multiple threads, for example a buffering thread, a play thread and an asynchronous messenger thread. The buffering thread in the IVP 106 is a thread which can asynchronously buffer the incoming video content to storage on the personal computer 102 while the IVP 106 plays already buffered content or performs any other task. The play thread of the IVP 106 is a thread which receives notifications from the buffering thread when sufficient video content has been buffered to play the video. The play thread also replays the interesting content indicated by the USMIC while the play thread waits for the buffering thread to send notifications of availability of new sufficient buffered content. The asynchronous messenger thread in the IVP 106 continuously monitors for availability of new metadata of buffered video content (MBC) 126.

The database 110 can contain user specific preferences or information 132, metadata of interesting video content (MIC) 128, buffered video content 130, metadata of buffered video content (MBC) 126, and user specific metadata of interesting video content (USMIC) 134.

The metadata of interesting video content (MIC) 128 contains the starting and stopping points of interesting video content within the buffered video content. The MIC 128 can also contain data regarding what is interesting to the user, along with other metadata.

User specific information (USI) 132 includes data regarding the likes, dislikes and preferences of the user. The data may be derived from a social profile of the user, previous viewing history, or other user specific information. The data may be collected by the browser 104 and/or the intelligent video player 106, or another mechanism over a period time.

The user preferences can be refined over time. The USI 132 is preferably updated as the system learns more about het user's preferences.

Metadata of buffered video content (MBC) 126 contains data regarding content that has currently been buffered by the intelligent video player 106. For example, the information may contain start and stop points in the video stream which can be used by the video analytics server 114 to analyze and determine interesting information about a particular portion of the buffered video content. MBC 126 contains a start stop point in the video stream which indicates what is buffered. As buffering takes place, the MBC 126 is updated to indicate how much of video has been buffered.

User specific metadata of interesting video content (USMIC) 134 contains data regarding user specific interesting content (USIC) 135 that can be replayed to the user by the intelligent video player 106 during buffering. This data is generated by the interesting content engine 108 after analyzing the metadata of interesting content 128 computed by the video analytics server 114 and the user specific information 132 stored by the browser 104 and the intelligent video player 106.

User specific interesting video content (USIC) 135 is a part of the video content which contains interesting content to replay, specifically for a given user while buffering of video content is underway.

The web server 112 can receive an access request 118 from the personal computer 102 and can pass the access request 118 to the content server 116. The web server 112 receives actual video content 122 of the video from the content server 116 and passes the actual video content 122 to the personal computer 102. The access request is a request sent by the user to the web server 112 to view actual video content.

The browser 104 can forward the user video request to a content server 116 (or follow any other mechanism to fetch the content) which hosts the video content requested by the user. It should be noted that the web server 112, content server 116 and VAS 114 are in the same intranet. On receiving the user video request, the content server 116 starts streaming the video content back to the browser 104 via the web server 112.

On the browser 104, a video intelligent player 106 is invoked to play the video content streamed from the content server 116. The intelligent video player 106 buffers the video content to storage accessible to the user's computer 102. The IVP 106 starts to play the buffered video when a predetermined threshold of the video has been buffered.

The content server 116 has access to the actual video content. The content server 116 receives access requests 118 from the web server 112 and returns the actual video content to the personal computer 102 through the web server 112. The content server 116 also receives metadata of buffered video content 126 from the personal computer 102 via the video analytics server 114, if present. The content server 116 provides buffered video content 130 to the personal computer 102 via the video analytics server 114, if present.

The video analytics server 114 is a server which can apply video analytics algorithms to determine which portion of a video contains potential interesting or user relevant video content for the viewer and what is interesting or relevant about that portion of video, for example through a no-ad content program 66.

When the video analytics server 114 is present on a same intranet as the content server 116 or some other location, other than the user's personal computer 102, the video analytics server 114 can send metadata of buffered video content 126 to the content server 116 to obtain the buffered video content 130. It should be noted that it is preferable for the video analytics server 114 to obtain the buffered video content from the content server 116 to save the user's internet bandwidth. The video analytics server 114 can then use the buffered video content 126 to determine metadata of interesting content 128 that the intelligent video player 106 can play for the user during buffering of the video selected by the user.

At the start of the video, while the IVP 106 buffers the video content to storage of the personal computer 102 for the first time, a buffering thread in the IVP 106 continuously monitors to determine if the threshold to play the buffered video content has been reached. The buffering thread also updates the metadata of buffered video content 126 and user specific information 132.

When enough new buffered video content is available to play (based on the pre-defined thresholds), the buffering thread in the intelligent video player 106 notifies a playing thread of the intelligent video player 106 to play the new buffered video content, which plays the video content until there isn't any more video content to play. The buffering thread in the intelligent video player 106 continues to asynchronously buffer the incoming video data and update metadata of buffered video content 126 and user specific information 132 accordingly while the play thread in the intelligent video player 106 plays the available content.

Once the buffered video content has been played, if the buffering thread indicates to the play thread of the intelligent video player 106 that more buffered video content is available to play, the play thread continues playing the next available buffered video content while the buffering thread continues to buffer asynchronously and updates metadata of buffered video content 126 and user specific information 132 in the background. However, if the play thread in the intelligent video player 106 does not receive a notification from the buffering thread, it checks if there is video content from the already buffered video content which will match with the user's interest and preference. This check is performed by looking for availability of user specific metadata of interest video content (USMIC) 134 generated by intelligent content engine (ICE) 108. USMIC 132 refers to user specific interest content (USIC) 135 which is the content which matches with the user's interest and preference and is a good candidate for re-playing for the user during buffering of additional video content. The asynchronous method to find this interesting content for user from already buffered content (USIC) is described in further detail below.

The asynchronous messenger thread in the IVP 106 continuously monitors for availability of new metadata of buffered video content (MBC) 126. The asynchronous messenger thread in the intelligent video player 106 sends the new MBC 126 generated by the buffering thread to the video analytics server 114. The video analytics server 114 analyzes the portion of the video content represented by metadata of the buffered video content 126 and returns the metadata of interesting content (MIC) 128 back to the messenger thread in the intelligent video player 106. This MIC 128 represents all content that could be of interest to replay to any user. On receiving the MIC 128 from the video analytics server 114, the messenger thread in the IVP 106 invokes the intelligent content engine (ICE) 108. The ICE 108 combines the MIC 128 supplied by the messenger thread with the USI 132 collected by the web browser 104 and the intelligent video player 106, to provide interesting portions of the already buffered video content which can be replayed to the specific user while further buffering takes place. The metadata of user specific interesting content (USMIC) 134 generated by ICE 108 after analyzing metadata of interesting content (MIC) 128 and user specific information (USI) 132. USMIC 134 represents a group of various bits of interesting content that is further given a weightage representing how interesting a particular piece in the group is to a given user. The frequency and number of times that the interesting video content is replayed can be a function of that weightage.

Whenever new buffered video content is not available for playing by the intelligent video player 106, the play thread of the IVP 106 uses the USMIC 134 generated by the ICE 108 to replay user specific interesting content (USIC) 135 to the user. Even after playing the interesting content indicated by USMIC 134, if the play thread of the IVP 106 has not received notification from the buffering thread, the play thread again replays content indicated by USMIC 134. As a result, until the play thread receives a notification from buffering thread that new buffered content 130 is available for playing, and the IVP 106 continues to play the content indicated by USMIC 134 unless it reaches a threshold, in which case the player errors out. The threshold is the number of times the same interesting content can be replayed sequentially before an error is displayed.

In one embodiment, a threshold can be set for a number of times content is replayed before displaying an error message indicating that no new content is available for display. This is useful in situations where the link is broken and the original content is no longer being delivered to the personal computer or some other similar error conditions.

Figure 3:
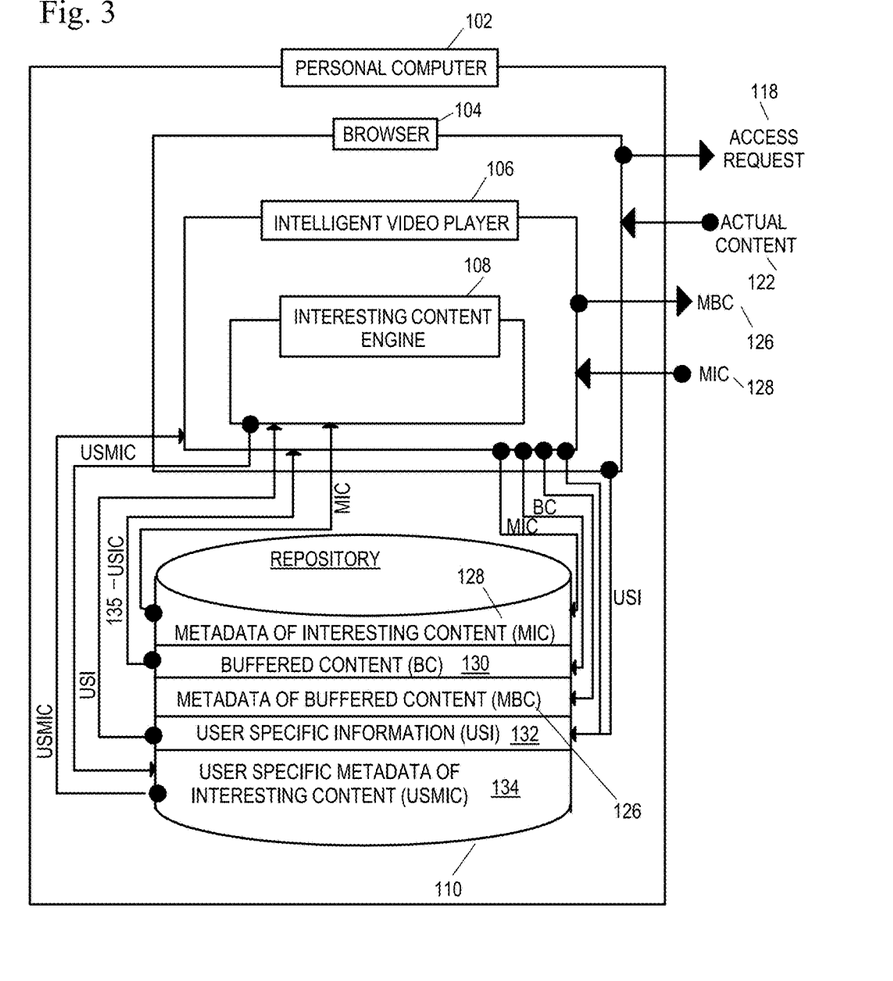
FIG. 3 shows a diagram of data and metadata flow on a computer used by a user to watch an online video.

FIG. 3 shows a diagram of data and metadata flow on a computer used by a user to watch an online video.

The browser 104 sends access requests 118 to the content server 116 via the web server 112 and receives actual video content 122 from the content server 116 via the web server 112. The browser 104 also sends user specific information regarding the video content requested and watched to the database 110.

The intelligent video player 106 sends metadata of buffered content (MBC) 126 to the content server 116 via the video analytics server 114. The intelligent video player 106 also sends metadata of interesting content (MIC) 128, buffered video content (BC) 130, metadata of buffered video content (MBC) 126, and user specific information (USI) 132 to the database 110. The intelligent video player 106 receives metadata of interesting video content (MIC) 128 from the video analytics server 114, and also receives buffered video content (BC) 130 and user specific metadata of interesting video content (USMIC) 134 from the database 110. Buffered video content (BC) is a part of the video content which has been buffered on a storage device accessible to the personal computer 102.

The interesting content engine 108 sends user specific interesting content (USIC) 135 to the database 110. The interesting content engine (ICE) 108 can also receive user specific information (USI) 132 and metadata of interesting video content (MIC) 128 from the database 110.

Figure 2:
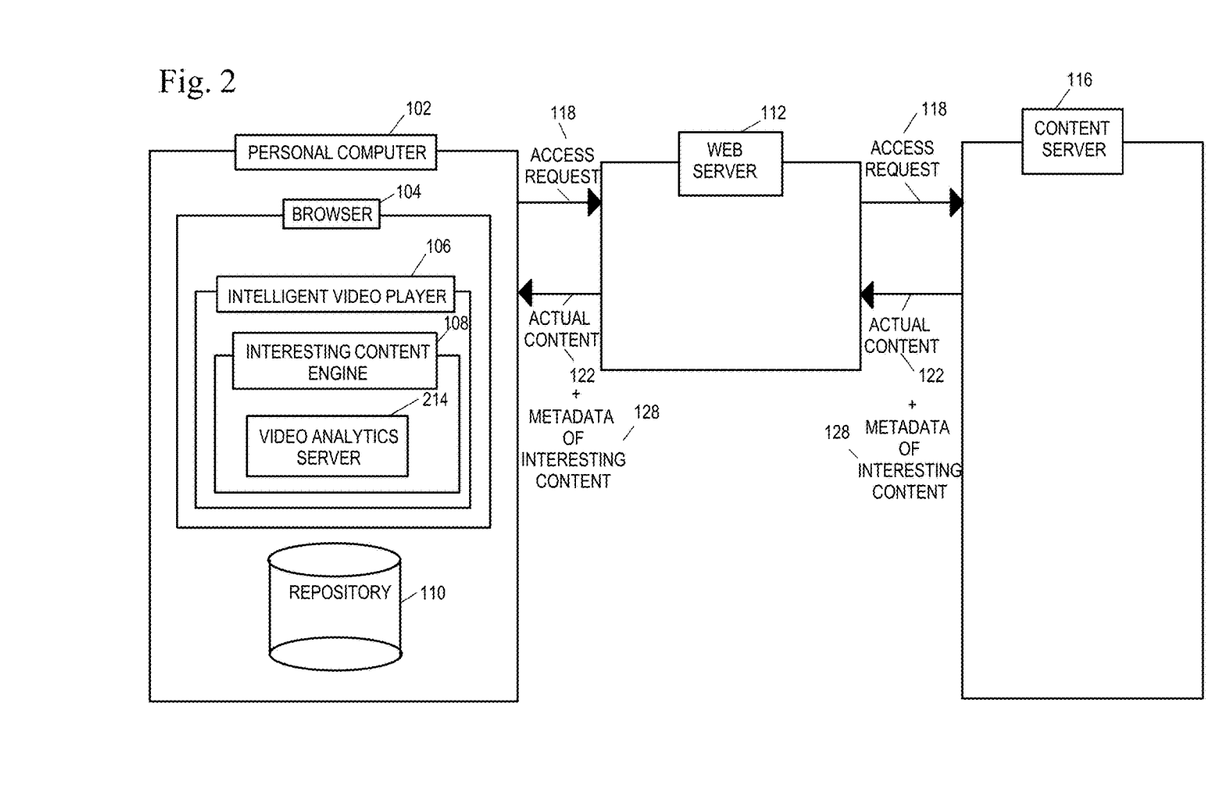
FIG. 2 shows a block diagram of an embodiment of an alternate video analytics system.

FIG. 2 shows a block diagram of an alternate embodiment where the video analytics system. When the video analytics server 214 is present on the user's personal computer 102 as shown in FIG. 2, instead of located as a separate server as shown in FIG. 1, the video analytics server 114 receives actual content 122 and metadata of interesting video content (MIC) 128 from the content server 116, via the web server 112, processes the content accessible to the user's personal computer 102 and provides the metadata of interested video content (MIC) 128 to the intelligent video player 106.

Figure 6:
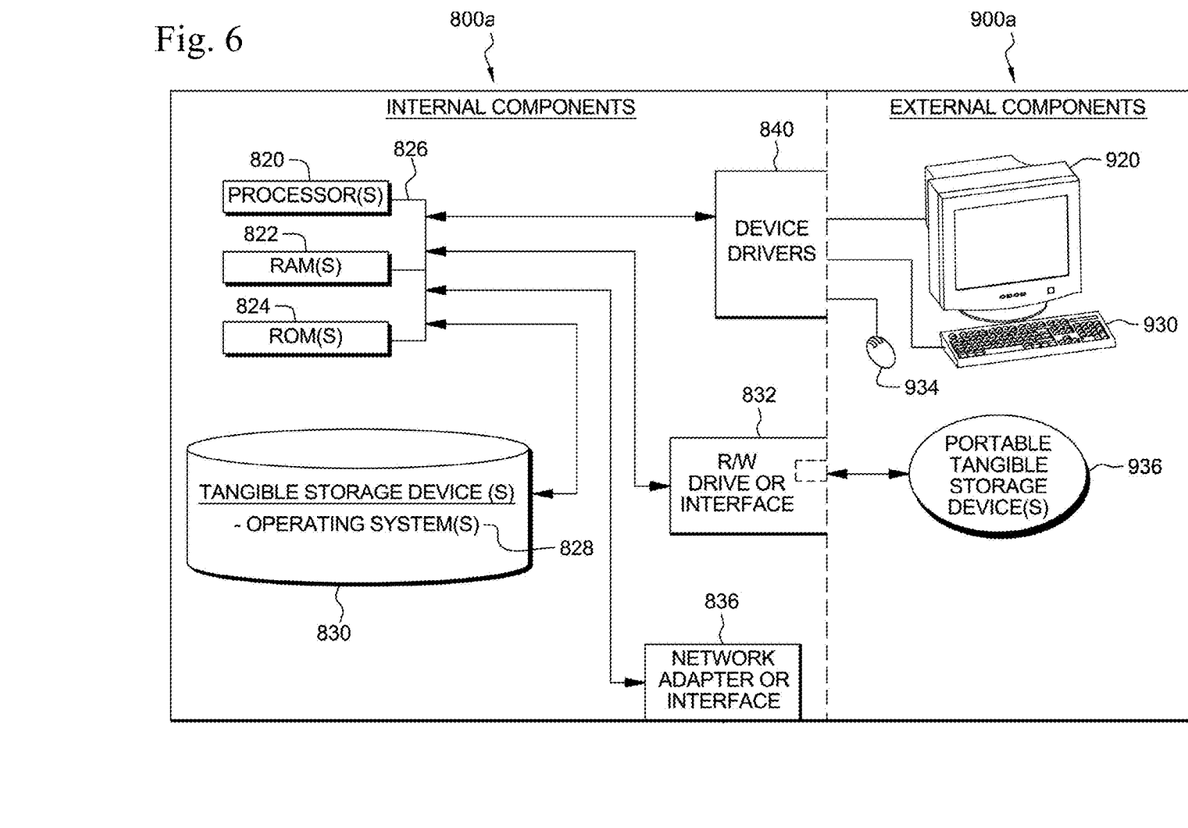
FIG. 6 illustrates internal and external components of a client computer and a server computer in which illustrative embodiments may be implemented.

FIG. 6 illustrates internal and external components of a personal computer 102, a web server 112, a video analytics server 114, and a content server 116 in which illustrative embodiments may be implemented. In FIG. 6, a personal computer 102, a web server 112, a video analytics server 114, and a content server 116 includes respective sets of internal components 800a and external components 900a. Each of the sets of internal components 800a includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and no-ad content program 66 are stored on one or more of the computer-readable tangible storage devices 830 for execution by one or more of the processors 820 via one or more of the RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, also includes a R/W drive or interface 832 to read from and write to one or more portable computer-readable tangible storage devices 936 such as a CD-ROM, DVD, memory stick, magnetic tape, magnetic disk, optical disk or semiconductor storage device. No-ad content program 66 can be stored on one or more of the portable computer-readable tangible storage devices 936, read via R/W drive or interface 832 and loaded into hard drive 830.

Each set of internal components 800a also includes a network adapter or interface 836 such as a TCP/IP adapter card. No-ad content program 66 can be downloaded to the personal computer 102, a web server 112, a video analytics server 114, and a content server 116 from an external computer via a network (for example, the Internet, a local area network or other, wide area network) and network adapter or interface 836. From the network adapter or interface 836, no-ad content program 66 is loaded into hard drive 830. No-ad content program 66 can be downloaded to web server 112, video analytics server 114, and content server 116 from an external computer via a network (for example, the Internet, a local area network or other, wide area network) and network adapter or interface 836. From the network adapter or interface 836, non-ad program 66 is loaded into hard drive 830. The network may comprise copper wires, optical fibers, wireless transmission, routers, firewalls, switches, gateway computers and/or edge servers.

Each of the sets of external components 900a includes a computer display monitor 920, a keyboard 930, and a computer mouse 934. Each of the sets of internal components 800a also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

No-ad program 66 can be written in various programming languages including low-level, high-level, object-oriented or non object-oriented languages. Alternatively, the functions of a no-ad program 66 can be implemented in whole or in part by computer circuits and other hardware (not shown).

Figure 4:
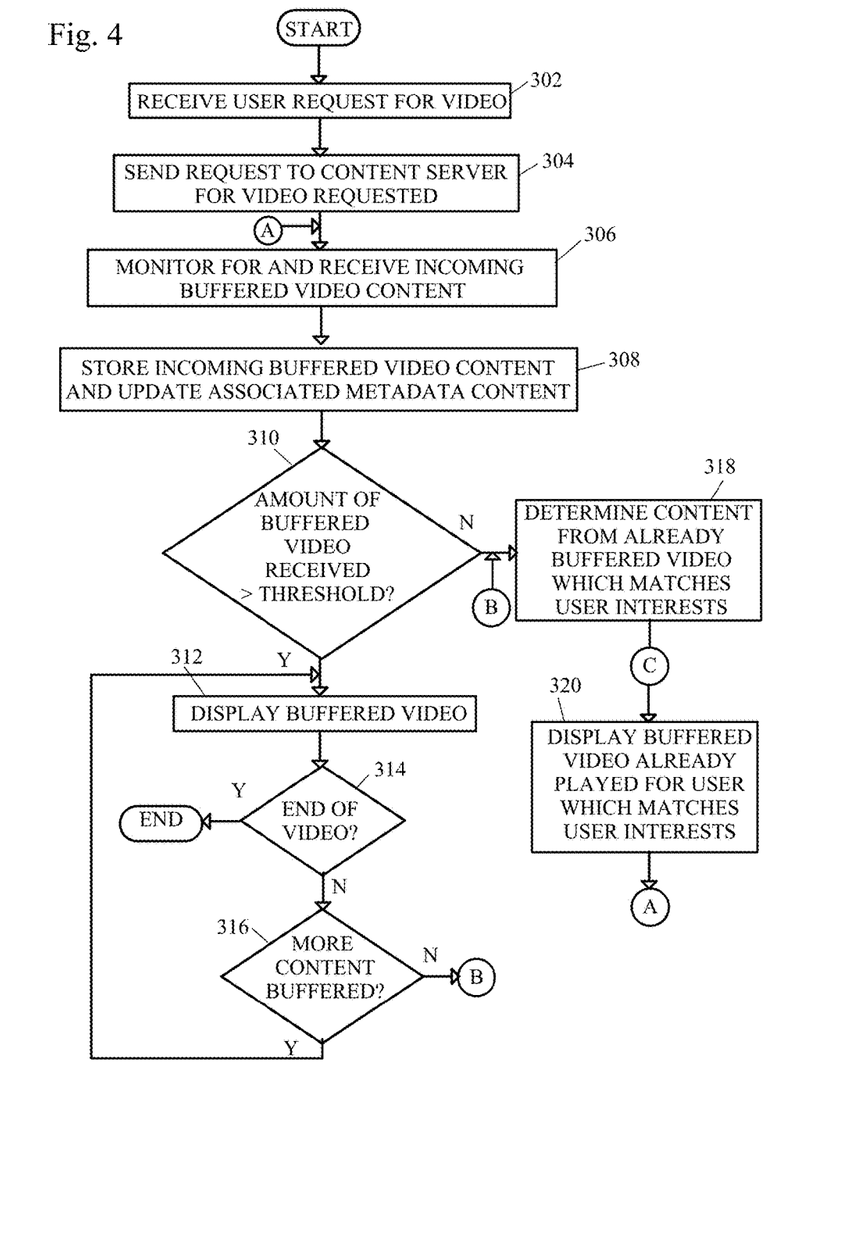
FIG. 4 shows a flow diagram of a method of providing non-ad content to a user during buffering of requested video content.

FIG. 4 shows a flow diagram of a method of providing non-ad content to a user during buffering of requested video content.

In a first step, the intelligent video player 106 of a browser 104 receives a user's request for a video (step 302). The request may be received directly from the user or via the browser 104. The intelligent video player 106 sends the request to the content server 116 for the video requested (step 304). The intelligent video player 106 may send the request to the content server 116 via the web server 112.

The intelligent video player 106 monitors for incoming buffered video content in response to the request (step 306). The intelligent video player 106 updates the incoming buffered video and associated metadata content of the video requested (step 308).

If the amount of buffered video content received is above a threshold for display through the intelligent video player 106 to the user (step 310), the buffered video content is displayed to the user via the intelligent video player 106 (step 312).

If the video has played in its entirety (e.g. the video has reached an end time or the user stops or halts the request for the video) (step 314), the method ends.

If the video has not played in its entirety (step 314), and more video content has been buffered (step 316), the method returns to step 312 to display and play the buffered video content of the intelligent video player 106. The buffering of the video content includes storing the buffered video content in temporary storage of the personal computer and updating the associated metadata content of the user in the repository 110.

If the video has not played in its entirety (step 314), and more video content has not been buffered (step 316), the method continues to step 318 described below.

If the amount of buffered video content received is not above a threshold for display through the intelligent video player 106 to the user (step 310), the intelligent video player 106 determines video content from already buffered videos, which has been viewed by the user that matches the user's interests (step 318). The buffered video, which has already been viewed by the user, and matches the user's interests, is displayed to the user via the intelligent video player 106 when the remainder of the video content requested is being buffered (step 320). The method then continues to step 306 of monitoring for incoming buffered video.

Figure 5:
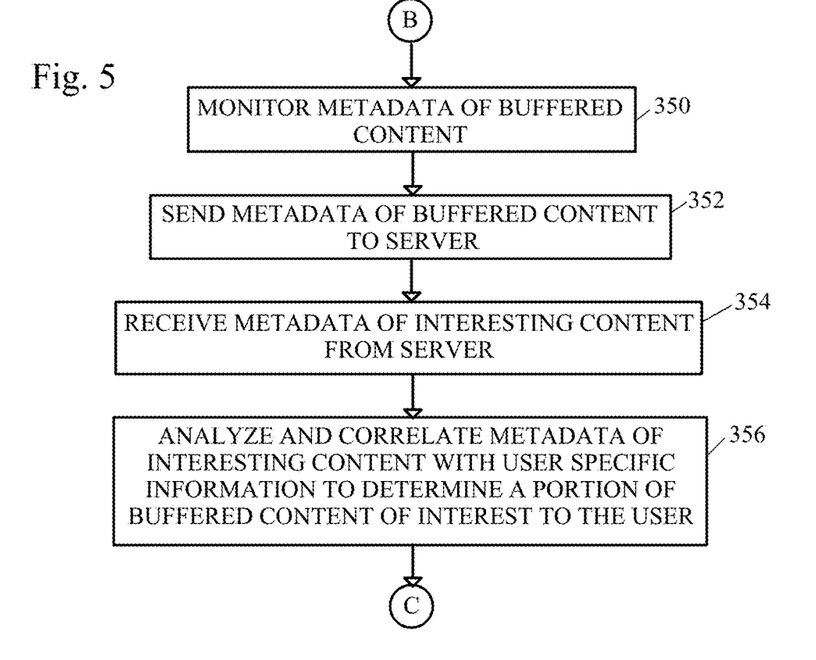
FIG. 5 shows a flow diagram of a method of determining content from already buffered video to match user interests.

FIG. 5 shows a flow diagram of a method of determining content from already buffered video to match user interests.

In a first step, the intelligent video player 106 monitors for metadata of buffered video content (step 350).

The intelligent video player 106 sends metadata of buffered video content to a server (step 352), for example the video analysis server 114. The intelligent video player 106 then receives metadata of interesting video content from a server (step 354), for example the video analysis server 114.

The intelligent video player 106 then analyzes and correlates the metadata of interesting content with user specific information to determine a portion of the buffered video content to display to the user via the intelligent video player 106 (step 356). The method then continues to step 320 to play the interesting part of the already buffered video content.

For example, once the buffering thread has generated a MBC 126, which is the start stop point(x,y) in the video stream indicating what content has been buffered, an asynchronous messenger thread of the intelligent video player 106 sends the MBC(x,y) to the video analytics server 114. The video analytics server 114 then analyzes a portion of the video indicated by MBC(x,y) and returns metadata of interesting content 128 of ((p,q,playerA), (h,j,playerB), (k,l, playerC)) to the messenger thread. On receiving the MIC 128, the messenger thread invokes the interesting content engine 108 and passes the MIC((p,q,playerA), (h,j,playerB), (k,l, playerC)) to ICE 108. The ICE 108 combines the MIC((p,q,playerA), (h,j,playerB), (k,l, playerC)) with user specific information of USI(userA, playerB) collected from the web browser 104 and/or the intelligent video player 106 and generates USMIC(h,j,playerB). This basically means user A likes player B and the buffered video contains content with player B's between points h and j. Whenever the playing thread has to wait because not enough video content has been buffered, the USMIC, which has been generated asynchronously, plays the content indicated by the USMIC through the IVP 106. Since USMIC has been generated considering user A's preference, the replay will keep the user engaged while buffering takes place in the back ground.

In another example, consider user A is a fan of Rahul Dravid and user B is a fan of Sachin Tendulkar. When both the users are watching the video stream of the same cricket match and are facing streaming issues due to slow internet connection, the system of the present invention can determine that user A likes Rahul Dravid and replays highlights of Rahul's innings during buffering of additional video content. However for user B, the system replays Sachin's innings during buffering of additional video content. All of this is done seamlessly without the user providing any additional information and without needing to fetch additional video content from an already under-performing Internet network. The system of the present invention gathers the interesting content that can be replayed from already streamed/buffered parts of the cricket match.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of providing non-ad content to a user during buffering of requested video content for display to a user through a display of a computer, the computer comprising a browser with a video player and an interesting content engine in communication with a repository, the method comprising the steps of:
    the computer requesting video content from a content server;
    the computer receiving buffered video content, associated metadata of the buffered video content indicating a start stop in the video content indicating video content buffered, and user specific information;
    the computer displaying the buffered video content when a quantity of the buffered video content is above a threshold until the quantity of buffered video content remaining is below the threshold and sending the associated metadata of the buffered video content to the content server;
    the computer receiving metadata of interesting content specific to the user associated with the buffered video content determined from the associated metadata of the buffered video content and the user specific information when the quantity of buffered video content is below a threshold, the interesting content engine of the computer creating a user specific metadata of interesting video content including a plurality of previously viewed, buffered video content clips which feature user specific interesting content stored in the repository reflecting user specific interests based on the metadata of interesting content specific to the user and associated with the buffered video content stored in the repository; and
    the computer replaying the previously viewed buffered content of the user specific metadata of interesting video content to the user during buffering of the video content requested by the user.

2. The method of claim 1, wherein the metadata of interesting content is received from the content server via a video analytics server.

3. The method of claim 1, wherein the repository stores specific information to the user.

4. The method of claim 1, wherein the previously viewed buffered content of the user specific metadata of interesting video content is replayed to the user a set number of times during buffering of the video.

5. A computer program product for providing non-ad content to a user during buffering of requested video content for display to a user through a display of a computer, the computer comprising at least one processor, one or more memories, one or more computer readable storage media, a browser with a video player and an interesting content engine in communication with a repository, the computer program product comprising a computer readable storage medium having program instructions embodied therewith, the program instructions executable by the computer to perform a method comprising:
    requesting, by the computer, video content from a content server;
    receiving, by the computer, buffered video content, associated metadata of the buffered video content indicating a start stop in the video content indicating video content buffered, and user specific information;
    displaying, by the computer, the buffered video content when a quantity of the buffered video content is above a threshold until the quantity of buffered video content remaining is below the threshold and sending the associated metadata of the buffered video content to the content server;
    receiving, by the computer, metadata of interesting content specific to the user associated with the buffered video content determined from the associated metadata of the buffered video content and the user specific information;
    when the quantity of buffered video content is below a threshold, the interesting content engine of the computer creating a user specific metadata of interesting video content including a plurality of previously viewed buffered video content clips which feature user specific interesting content stored in the repository reflecting user specific interests based on the metadata of interesting content specific to the user and associated with the buffered video content stored in the repository; and
    replaying, by the computer, the previously viewed buffered content of the user specific metadata of interesting video content to the user during buffering of the video content requested by the user.

6. The computer program product of claim 5, wherein the metadata of interesting content is received from the content server via a video analytics server.

7. The computer program product of claim 5, wherein the repository stores specific information to the user.

8. The computer program product of claim 5, wherein the previously viewed buffered content of the user specific metadata of interesting video content is replayed to the user a set number of times during buffering of the video.

9. A computer system for providing non-ad content to a user during buffering of requested video content for display to a user through a display of a computer, the computer system comprising a computer comprising at least one processor, one or more memories, a browser with a video player and an interesting content engine in communication with a repository, one or more computer readable storage media having program instructions executable by the computer to perform the program instructions comprising:

requesting, by the computer, video content from a content server;

receiving, by the computer, buffered video content, associated metadata of the buffered video content indicating a start stop in the video content indicating video content buffered, and user specific information;

displaying, by the computer, the buffered video content when a quantity of the buffered video content is above a threshold until the quantity of buffered video content remaining is below the threshold and sending the associated metadata of the buffered video content to the content server;

receiving, by the computer, metadata of interesting content specific to the user associated with the buffered video content determined from the associated metadata of the buffered video content and the user specific information;

when the quantity of buffered video content is below a threshold, the interesting content engine of the computer creating a user specific metadata of interesting video content including a plurality of previously viewed buffered video content clips which feature user specific interesting content stored in the repository reflecting user specific interests based on the metadata of interesting content specific to the user and associated with the buffered video content stored in the repository; and replaying, by the computer, the previously viewed buffered content of the user specific metadata of interesting video content to the user during buffering of the video content requested by the user.

10. The computer system of claim 9, wherein the metadata of interesting content is received from the content server via a video analytics server.

11. The computer system of claim 9, wherein the repository stores specific information to the user.

12. The computer system of claim 9, wherein the previously viewed buffered content of the user specific metadata of interesting video content is replayed to the user a set number of times during buffering of the video.

* * * * *